MOUNTING ASSEMBLY FOR MAGNETIC STRIP STORAGE CELLS

Filed April 4, 1966 2 Sheets-Sheet 1

INVENTOR
DAVID L. STODDARD

By Robert E. Crouch
ATTORNEY

May 12, 1970 D. L. STODDARD 3,512,144

MOUNTING ASSEMBLY FOR MAGNETIC STRIP STORAGE CELLS

Filed April 4, 1966 2 Sheets-Sheet 2

United States Patent Office 3,512,144
Patented May 12, 1970

3,512,144
MOUNTING ASSEMBLY FOR MAGNETIC STRIP STORAGE CELLS

David L. Stoddard, Los Gatos, Calif., assignor to International Business Machines Corporation, Armonk, N.Y., a corporation of New York Filed Apr. 4, 1966, Ser. No. 540,046
Int. Cl. G11b *5/00*
U.S. Cl. 340—174.1 9 Claims

ABSTRACT OF THE DISCLOSURE

A flexible strip storage apparatus includes a multiplicity of elongated cells containing strips on the periphery of a cylindrical spindle. The cells may be removed for off-line storage and replaced by like cells. To remove a cell, the spindle is braked and then rotated to align the cell with a release lever. A protective cover for each cell is provided to prevent contamination and spilling of contents. The cover assembly includes a carrying handle and locking mechanism to couple the cell to the storage apparatus.

The present invention relates to a large capacity data storage device in which an array of magnetic strips is movable relative to a read/write station, and more particularly, to a mounting assembly for securing groups of strips firmly in position for access by a read/write station while permitting easy removal and replacement of the groups.

Large capacity data storage devices which employ a large number of strips of magnetic recording tape have been suggested at various times heretofore. These devices have generally featured an array of strips positioned near a read/write station, some means for accessing a selected strip, and a means of effecting relative movement between the selected strip and a magnetic transducer in the read/write station. To permit realization of the advantages of a magnetic strip storage device, i.e., large on-line data storage capacity combined with moderate average access time, it has been proposed to arrange the strips in a cylindrical array that is rotated to position a desired strip beneath a fixed read/write station. This requires that the strips be firmly supported, so that they will resist being displaced by the forces generated during rotation of the array and that each strip be immediately accessible after arriving in position below the read/write station. In addition, if off-line storage capability is desired, provision must be made for removing strips from the array and replacing them with other strips which are interchangeable. This requires that the strips be protected from contamination or careless handling when they are removed for off-line storage. As a practical solution to these requirements is has been proposed to assemble the strips in groups and then support a number of such groups in elongated hollow receptacles or cells which are secured to a motor-driven spindle for rotation relative to the read/write station. The cells, which are interchangeable, support the strips in position for ready access in the on-line condition and serve as protective storage receptacles for the strips in the off-line condition.

The object of the present invention is to provide a mounting assembly for firmly securing a cell of strips to a rotatable spindle while preventing removal of the cell until a protective cover is installed and which will block rotation of the spindle unless the cell is in a predetermined position thereon.

The present invention provides an assembly for mounting an elongated hollow cell of strips in a predetermined position on the periphery of a generally cylindrical spindle which is adapted for high-speed rotational movement. With the present invention the rear surface of the cell is registered both vertically and circumferentially and then clamped to the periphery of the spindle. The mounting assembly is activated from the front of the cell, so that minimum clearance need be provided between adjacent cells. Interlocks are provided which block rotation of the spindle unless a cell is registered in each cell position about the spindle and prevent disengagement of the cell and spindle until a protective cover for the strips is secured to the upper end of the cell.

The foregoing and other objects, features, and advantages of the invention will be apparent from the following more particular description of a preferred embodiment of the invention as illustrated in the accompanying drawings.

Figure 2:
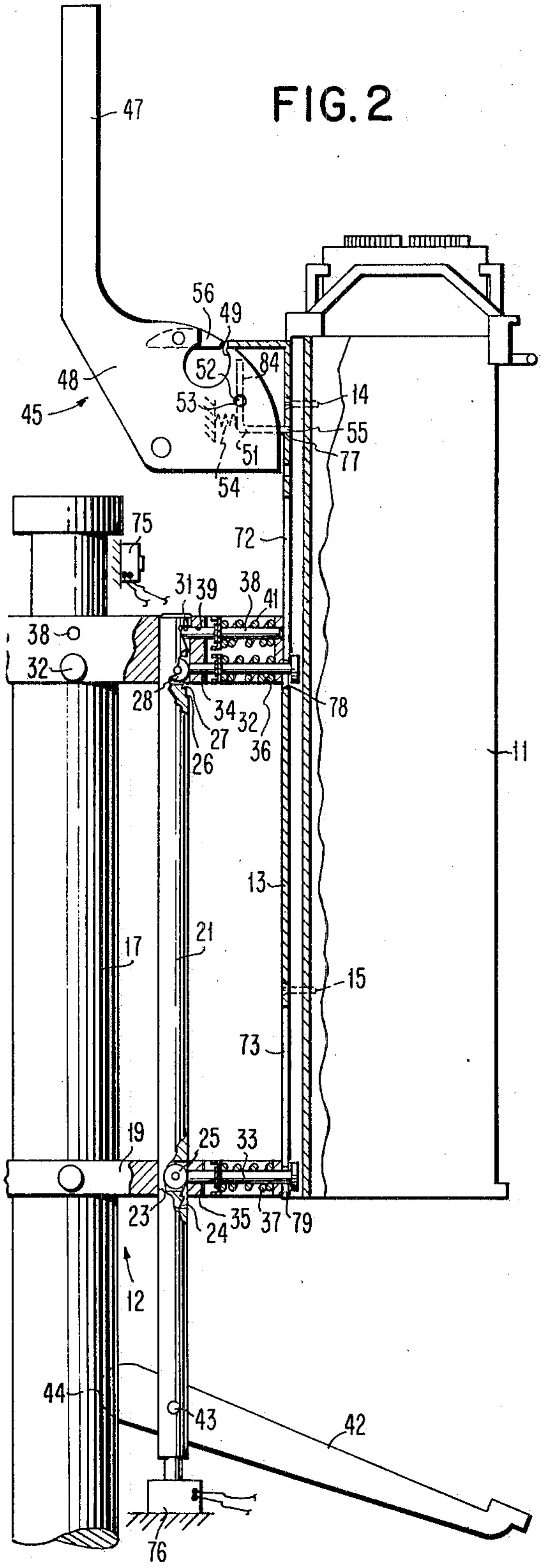
FIG. 2 is a view similar to FIG. 1 showing the cell in position to be disengaged from the spindle.

Referring to the drawings a hollow elongated cell such as is disclosed in U.S. Pat. 3,339,993 is illustrated at 11 as mounted on a spindle assembly 12. The cell includes an attachment plate 13 made of hardened steel, or similar material, which is secured to the rear surface of the cell, such as by screws 14 and 15. The attachment plate is spaced slightly from the rear surface of the cell and includes an out-turned lip 16 at its upper extremity. The spindle assembly 12 includes a central shaft 17 which is drivingly engaged with a motor (not shown) and a pair of vertically-spaced, generally-cylindrical flanged elements 18 and 19. The peripheries of the flanged elements are formed with vertically-aligned, flat chord sections equal in length to the width of the cell attachment plate. An elongated cam rod 21 is received in aligned openings 22 and 23 in elements 18 and 19 respectively, there being a separate cam rod for each cell position defined by aligned chord sections about the spider elements. The cam rod includes three separate cam areas, the lower one of which includes a notch 24 adjacent a hardened roller 25. The intermediate cam area includes a recessed land 26, a notch 27 and a hardened roller 28, while the upper cam area includes a land 29 adjacent a notch 31. A pair of clamping pins 32 and 33 are positioned in vertical alignment in spider elements 18 and 19 respectively. Each clamping pin is provided with an enlarged head and an elongated shank, the shank being received within a radially extending bore 34 and 35 which intersect the openings 22 and 23 respectively. The clamping pins are heavily loaded towards the cam rod by means of compression springs 36 and 37. A detent pin 38 is positioned in flanged element 18 above clamping pin 32. The detent pin is received within a radial bore 39 and spring loaded into contact with the cam rod by a compression spring 41. A cell release lever 42 is connected to the cam rod adjacent its lower extremity by means of a pivot pin 43. The inboard end of the release lever is received within an arcuate slot 44 in the shaft 17 which serves as a fulcrum while the outboard end of the lever extends beyond the front surface of the cell.

Figure 3:
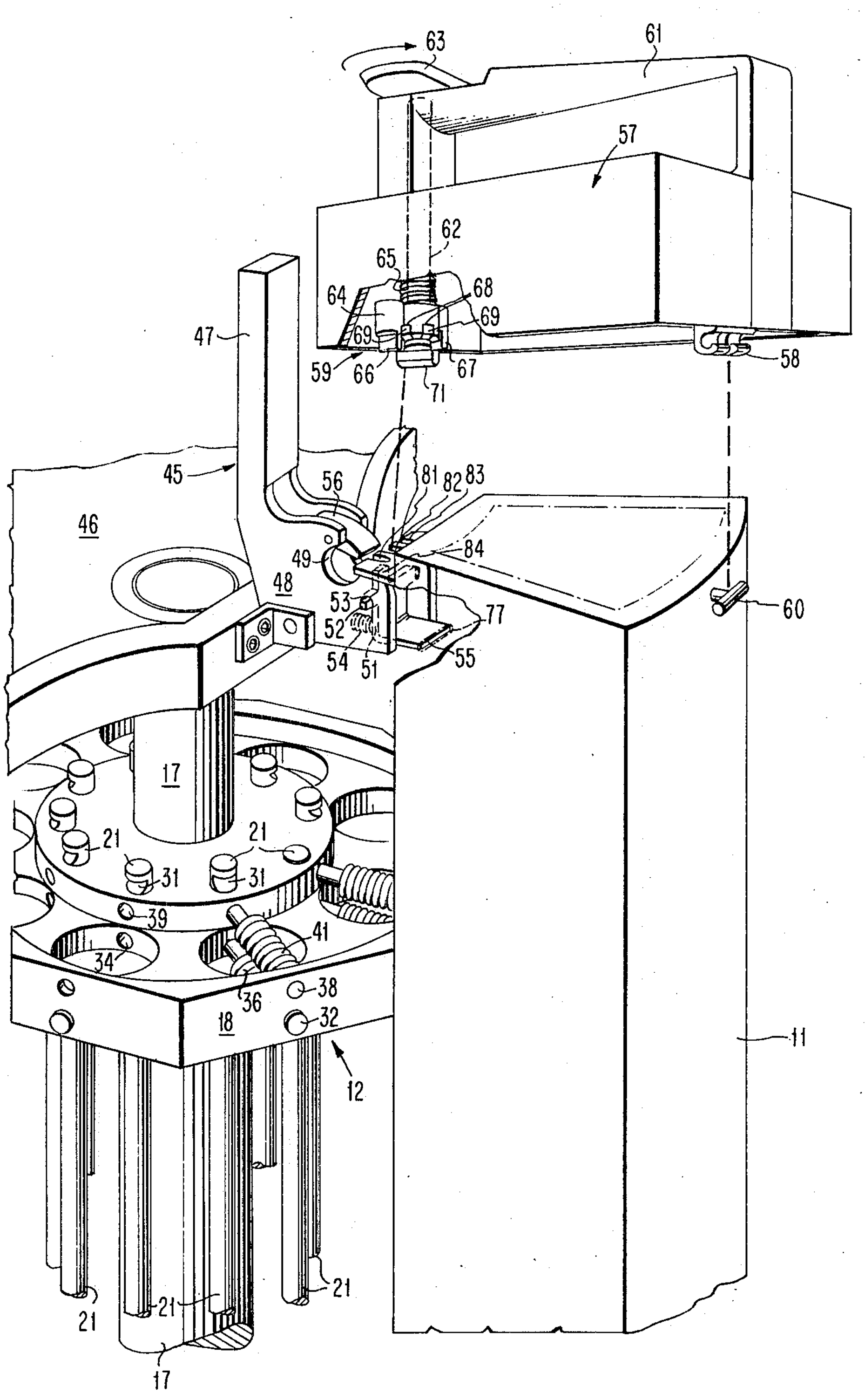
FIG. 3 is a perspective view showing a protective cover and the manner in which it cooperates with the cell and the remaining elements of the mounting assembly.

A cell elevating lever 45 is pivotally mounted on the machine frame 46, FIG. 3, above the spider element 18.

Lever 45 includes a handle section 47 and a lifting section 48. The handle section extends above the open end of the cell and protrudes beyond the front surface thereof. The lifting section is provided with a hollow interior and has an arcuate recess 49 adapted to receive the outturned lip 16 of the cell attachment plate 13. An L-shaped latch 51 is pivotally mounted in the interior of the lifting section, such as by outwardly extending ears 52 received in openings 53. The latch 51 is biased by spring 54 such that the latching leg 55 of the latch protrudes beyond the edges of the lifting section. A spring loaded stop 56 is pivoted in the lifting section, so that it protrudes into the arcuate recess 49 with an extremity adjacent the lip 16.

As shown in FIG. 3 the cell 11 is provided with a T-shaped attachment bar 60 protruding from its outer surface adjacent the upper end. A protective cover 57 is adapted to fit over the upper end of the cell. The cover is generally square and is internally recessed to receive the upper extremity of the magnetic strips positioned in the cell. A pair of spaced hinge lugs 58 protrude from the lower surface of the cover along one edge, while a locking mechanism 59 similarly protrudes from the opposite edge. A carrying handle 61 extends above the upper surface of the cover in line with the hinge lugs and locking mechanism. The locking mechanism includes an elongated cylindrical pin 62 which extends through the cover and a portion of the handle and terminates at the outer surface of the handle where it is keyed to a knob 63. A locking block 64 is received on the pin and biased away from the knob by a compression spring 65. The locking block is free to slide on the pin against the action of spring 65, but is prevented from rotating by the adjacent surface of the cover. The locking block includes a pair of spaced studs 66 and 67 which protrude away from the handle, and four recesses 68 extending radially of the pin and positioned 90 degrees apart. The pin 62, adjacent its free end is provided with four radially extending ears 69 spaced at 90 degree intervals about its periphery. A locking bar 71 is formed at the free extremity of the pin and extends in two directions beyond the lateral surfaces thereof.

Figure 1:
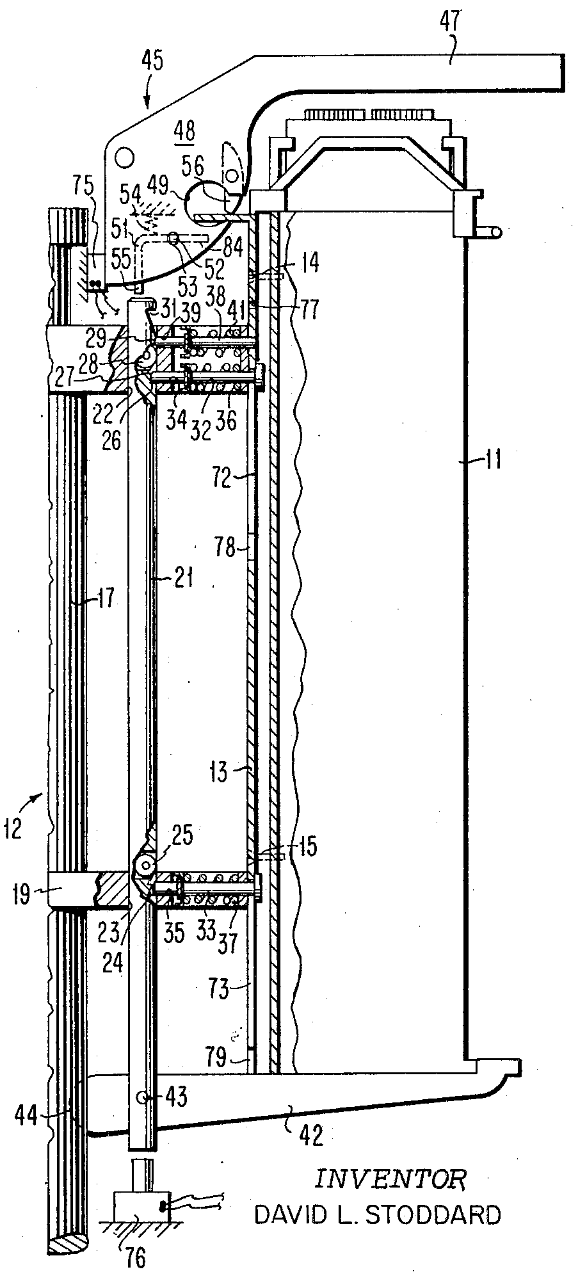
FIG. 1 is an elevation view partly in section of a cell secured to a spindle with the mounting assembly of the present invention.

When a cell of strips is mounted on the spindle it is supported on elements 18 and 19 by means of the clamping pins 32 and 33 which are received within elongated slots 72 and 73 formed in the attachment plate 13 of the cell. With the cam rod 21 in its elevated position as shown in FIG. 1 the clamping pins 32 and 33 are in line with the recessed land 26 and notch 24 respectively. In this position of the clamping pins the heavy compression springs 36 and 37 force the pins into the radial bores 34 and 35, so that the heads of the clamping pins clamp the attachment plate firmly against the chord sections of flanged elements. In this position of the cam rod, the detent pin 38 bears against land 29 and is extended from the bore 39, so that the free end of the detent pin extends into a detent recess 74 formed in the attachment plate 13 just prior to the clamping action of the clamping pins. The detent pin and the detent recess register the cell both vertically and circumferentially of the spindle before it is clamped to ensure that it is in the proper position. In the mounted position, the cell elevating lever 45 is depressed, so that the handle section is horizontal. In this position the rear edge of the lifting section 48 bears against and depresses the spring loaded plunger of a switch 75, thus closing the switch and allowing current to flow in the spindle drive circuits.

To remove a cell from the spindle, the spindle is braked and then rotated to align the cell with the cell elevating lever. The cell release lever 42 for that cell is then depressed as shown in FIG. 2. This causes the lower extremity of the cam rod to bear against and depress a spring loaded plunger of a switch 76 which opens the switch and interrupts the spindle drive circuit. As the cam rod is moved vertically downward by the release lever the ends of the clamping pins 32 and 33 come into contact with the sloping surfaces of the notches 27 and 24, respectively, and then bear against the rollers 28 and 25. The rollers form the actual cam surfaces for the clamping pins and are provided to prevent frictional wear which would result from the heavy loading of springs 36 and 37. As the cam rod moves downwardly the clamping pins are extended by the rollers, against the action of the compression springs 36 and 37, to release the clamping pressure exerted by the heads of the pins against the attachment plate. At the same time notch 31 allows the detent pin 38 to be withdrawn from the detent recess by the compression spring 41. In this condition the cell is supported by the shanks of the clamping pins bearing against the upper ends of the slots 72 and 73 in the attachment plate. After the cell release lever is depressed the handle section of the cell elevating lever 45 is moved in a counterclockwise direction. As the lever 45 is rotated the cell is lifted on the shanks of the clamping pins by means of recess 49 of the lifting section which bears against the lower surface of lip 16 of the cell attachment plate. This movement of the lifting section releases the plunger of switch 75 causing a further interruption of the spindle drive circuits. As lever 45 rotates and the cell rises the latching leg 55 of latch 51 is received within a slot 77 in the attachment plate. This locks the cell in the elevated position shown in FIG. 2. In this position the cell cannot be removed from the spindle, since the clamping pins are still in the elongated slots 72 and 73. Further elevation of the cell is required to bring the enlarged openings 78 and 79 at the ends of the elongated slots into alignment with the heads of the clamping pins to allow the cell to be separated from the pins by movement radially of the spindle. In its elevated position the top of the cell is available so the cover can be fitted over it. Clearance between adjacent cells in the on-line position of FIG. 1 is so small as to preclude attaching the cover in this position.

To release the L-shaped latch 51 and allow removal of the cell from the spindle requires the cover to be locked in place on the upper end of the cell. In this regard, latch 51 is in effect hidden in the lever 45 behind the cell where it is inaccessible. Referring to FIG. 3 the cover is held in a vertical position and the hinge lugs 58 slipped over the T-shaped attachment bar 60 which protrudes from the front surface of the cell. The cover is then rotated counter-clockwise to bring the locking mechanism 59 into proximity with the lip 16 which is formed with three slots 81, 82 and 83. As the cover is lowered the locking bar 71 is received within the center slot 82 while the studs 66 and 67 of the locking block are received in the outer slots 81 and 83. Continued rotation of the cover causes the studs to bear against the edges of the lifting section 48 forcing the locking block to ride up pin 62 as spring 65 is compressed until the ears 69 on the pin are clear of the slots 68 in the locking block. At this point the pin is free to rotate, so the knob 63 is moved in the direction of the arrow. This causes the locking bar 71 to bear against the rear of a vertical tab 84 on the L-shaped latch 51. Continued rotation of the pin and the locking bar causes the latch 51 to rotate against the action of spring 54 until the latching leg 55 is clear of the slot 77 in the attachment plate. At this point the locking bar, which is below the lip 16, is crosswise of the slot 82 and, as the handle 61 is lifted, the locking bar bears against the lower surface of the lip 16. This releases the pressure of the lifting section on the studs 66 and 67 allowing the locking block to be moved downwardly by the spring 65. As the locking block moves downwardly, the ears 69 are again received in the slots 68 to lock the pin against rotation. The cell can then be withdrawn by means of the handle and inserted in a dust-proof container for off-line storage.

To install a cell on the spindle the above procedure is reversed, that is, the enlarged openings 78 and 79 in the attachment plate are aligned with the heads of the clamping pins, the cell is moved radially against the elements 18 and 19 and then vertically downward until the lower surface of the lip 16 bears against the edge of the arcuate recess 49 in the cell elevating lever 45. The edges of the lifting section depress the spring 65 and elevate the locking block on pin 62. The knob 63 is then rotated clockwise to bring the locking bar 71 back to the position shown in FIG. 3 where it can be withdrawn from slot 82. At this point the cover is rotated clockwise until the hinge lugs 58 can be cleared from the T-bar 60 and the cover removed. The cell elevating lever 45 is then rotated to lower the cell to the position of FIG. 1 and close switch 75. The cell release lever 42 is then elevated, raising the cam rod 21. As the cam rod moves upwardly, the detent pin is extended on the inclined surface of notch 31 to register the cell in position by means of the detent recess 74. Immediately thereafter the rollers 28 and 25 are moved away from the clamping pins allowing the heads of the pins to be clamped against the attachment plate by means of the compression springs 36 and 37. When the cell release lever 42 is in the position of FIG. 1 the cam rod is clear of the plunger of switch 76 and the spindle drive circuit is completed.

With the mechanism as shown in FIGS. 1 and 2 the spindle is prevented from rotating unless a cell is in the position of FIG. 1. The cell elevating lever 45 can be moved to the position of FIG. 1 in the absence of a cell. This will close switch 75 and remove that interruption in the spindle drive circuit. However, the cell release lever 42 cannot be raised to the position of FIG. 1 unless the cell is on the spindle. As the cam rod starts to move upwardly clamping pin 32 will move off roller 28 and into notch 27 if there is no cell on the spindle. The ledge at the lower end of notch 27 will prevent further upward movement of the cam rod and the spring loaded plunger of switch 76 will remain depressed and the spindle drive circuit open. When a cell is on the spindle, the thickness of the attachment plate prevents clamping rod 32 from moving into the notch 27.

Provision is also made to prevent the cell from being forced upwardly by hand instead of being lifted by the cell elevating lever 45. When the cell is lifted by the elevating lever the latch 51 automatically engages in slot 77 to prevent the cell from being lifted off the spindle without the cover being attached. However, since the arcuate recess 49 is wider than the thickness of the lip 16, it is conceivable that the cell might be pushed from below, so that it would move faster than the elevating lever and the latch 51 would then not be received in the slot 77. This is prevented by means of the spring loaded stop 56 which causes the elevating lever 45 and the cell to move together, so that the latching leg 55 of the latch 51 would be received in slot 77 regardless of whether the lifting force is applied to handle 47 or to the cell itself.

While the invention has been particularly shown and described with reference to a preferred embodiment thereof, it will be understood by those skilled in the art that various changes and modifications may be made without departing from the spirit and scope of the invention.

What I claim is:

1. For use with a large capacity data storage device which employs strips of flexible tape as recording medium,
   an elongated hollow cell for supporting a number of strips of tape,
   attachment means carried by the cell for connecting the cell to the device, and
   a protective cover fit over one end of the cell, the cover including means for releasing the cell from the device when the cover is attached to the cell.

2. The combination set forth in claim 1 in which
   the attachment means includes a rigid plate adapted to be clamped to the device, the plate being attached to one surface of the cell.

3. The combination of claim 1 in which the data storage device includes driven means for rotating an array of strips past a fixed read/write station,
   mounting means carried by the driven means for securing the attachment means to the driven means, the mounting means including means for registering the cell in three dimensions to ensure accurate placement of the cell in a predetermined position.

4. The combination of claim 1 in which the data storage device includes a generally cylindrical spindle for supporting an array of strips in position for ready access by a fixed read/write station,
   means mounted in the spindle for clamping the attachment means to the periphery of the spindle, said means including a detent for registering the cell in a predetermined position.

5. For use with a large capacity data storage device which employs strips of flexible tape as recording medium,
   an elongated hollow cell for supporting a number of strips of tape,
   attachment means carried by the cell for connecting the cell to the device, including a rigid plate adapted to be clamped to the device, the plate being attached to one surface of the cell, and
   a protective cover fit over one end of the cell, including a carrying handle and a locking mechanism for locking the cover to a portion of the rigid plate, and means for releasing the cell from the device when the cover is attached to the cell.

6. For use with a large capacity data storage device which employs strips of flexible tape as a recording medium,
   an elongated hollow cell for supporting a number of strips of tape,
   attachment means carried by the cell for connecting the cell to the device,
   a protective cover fit over one end of the cell, including means for releasing the cell from the device when the cover is attached to the cell,
   driven means for rotating an array of strips past a fixed read/write station,
   mounting means carried by the driven means for securing the attachment means to the driven means, the mounting means including means for registering the cell in three dimensions to ensure accurate placement of the cell in a predetermined position,
   means for selectively releasing the mounting means, and
   a latch mounted on the device which prevents disengagement of the cell from the driven means until the protective cover is installed on the cell.

7. For use with a large capacity data storage device which employs strips of flexible tape as recording medium,
   an elongated hollow cell for supporting a number of strips of tape,
   attachment means carried by the cell for connecting the cell to the device,
   a protective cover fit over one end of the cell, including means for releasing the cell from the device when the cover is attached to the cell,
   a cylindrical spindle for supporting an array of strips in position for ready access by a fixed read/write station,
   means mounted in the spindle for clamping the attachment means to the periphery of the spindle, including a detent for registering the cell in a predetermined position, and
   a cam rod mounted in the spindle for controlling the detent and the means for clamping, the cam rod being actuated from the exterior of the cell.

8. The combination of claim 7 including
   a lever mounted on the device above the spindle and adapted to engage the attachment plate to elevate the cell on the spindle.

9. The combination of claim 7 including
a latch pivotally mounted in the lever for engaging the attachment means to prevent disengagement of the cell from the spindle until the cover is installed on the cell.

References Cited

UNITED STATES PATENTS

| | | | |
|---|---|---|---|
| 3,307,555 | 3/1967 | Thies et al. | 340—174.1 |
| 3,378,826 | 4/1968 | Gabor | 312—234.1 |

OTHER REFERENCES

"Strip Storage Access Mechanism," Johnson and Walker, IBM Technical Disclosure Bulletin, vol. 5, No. 11, April 1963.

STANLEY M. URYNOWICZ, Jr., Primary Examiner

V. P. CANNEY, Assistant Examiner

U.S. Cl. X.R.

220—23.8; 242—55.13; 312—234.4